(12) United States Patent
Fenney et al.

(10) Patent No.: US 7,868,899 B2
(45) Date of Patent: *Jan. 11, 2011

(54) 3-D GRAPHICS TEXTURING SYSTEM USING ENCRYPTED TEXTURES

(75) Inventors: Simon Fenney, Hertfordshire (GB); Martin Ashton, Hertfordshire (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/644,139

(22) Filed: Dec. 22, 2006

(65) Prior Publication Data
US 2007/0103481 A1 May 10, 2007

Related U.S. Application Data

(63) Continuation of application No. 10/969,491, filed on Oct. 20, 2004, now Pat. No. 7,176,934, which is a continuation of application No. 10/236,068, filed on Sep. 3, 2002, now abandoned.

(30) Foreign Application Priority Data

Sep. 4, 2001 (GB) .................................. 0121382.6

(51) Int. Cl.
*G06T 11/30* (2006.01)
*G06T 15/00* (2006.01)
*G06T 9/00* (2006.01)
*G09G 5/00* (2006.01)
*G09G 5/36* (2006.01)
*H04N 7/167* (2006.01)
*G06T 15/20* (2006.01)

(52) U.S. Cl. ................... 345/582; 345/422; 345/501; 345/555; 345/552; 380/201; 713/161; 713/167; 713/189; 713/193

(58) Field of Classification Search ................. 345/418, 345/419, 422, 581–583, 501, 530, 538, 545, 345/555, 552, 556; 715/182, 187, 189, 200, 715/193; 380/200–201, 277–278, 282, 284; 713/161, 165, 167; 705/51
See application file for complete search history.

(56) References Cited

U.S. PATENT DOCUMENTS 5,580,186 A * 12/1996 Tassone et al. ........... 405/154.1

(Continued)

FOREIGN PATENT DOCUMENTS

GB 2 343 599 A 5/2000
WO WO 98/27515 A1 6/1998

OTHER PUBLICATIONS

United Kingdom Patent Office Search Report, Sep. 20, 2002 (3 pages).

*Primary Examiner*—Wesner Sajous
(74) *Attorney, Agent, or Firm*—Flynn, Thiel, Boutell & Tanis, P.C.

(57) ABSTRACT

A texturing system for use in a three-dimensional graphics system has an input for receiving object data for an object to be textured. Encrypted texture data is obtained from a store and decrypted in a decryption unit. The decrypted texture data generates texture image data for a frame buffer from which the texture image data can be outputted for display. A method for producing a software application for using in a three-dimensional graphics system which creates instructions for a software application and static texture data for using in conjunction with the instructions is also provided. The static texture data is encrypted and provided as encrypted texture data with the software instructions. A protected software application can be distributed to a target device from a distribution device by coupling the distribution device to the target device, transferring target device identifier data from the target device to the distribution device, and using the target device identifier data in the distribution device to generate encryption definition data specific to the target device. The protected software application and encryption definition data are transferred to the target device.

13 Claims, 5 Drawing Sheets

U.S. PATENT DOCUMENTS

| | | | |
|---|---|---|---|
| 5,596,718 | A | 1/1997 | Boebert et al. |
| 5,630,043 | A | 5/1997 | Uhlin |
| 5,982,892 | A * | 11/1999 | Hicks et al. .................... 705/51 |
| 6,215,500 | B1 | 4/2001 | Deering |
| 6,567,914 | B1 | 5/2003 | Just et al. |
| 6,602,139 | B2 | 8/2003 | Yamaguchi |
| 6,681,212 | B1 * | 1/2004 | Zeng ........................... 705/51 |
| 7,155,415 | B2 * | 12/2006 | Russell et al. .................. 705/59 |
| 7,176,934 | B2 * | 2/2007 | Fenney et al. ................ 345/582 |
| 7,277,870 | B2 * | 10/2007 | Mourad et al. ................ 705/51 |
| 2001/0029581 | A1 * | 10/2001 | Knauft ....................... 713/193 |
| 2002/0049910 | A1 | 4/2002 | Salomon et al. |
| 2002/0150248 | A1 | 10/2002 | Kovacevic |
| 2002/0159595 | A1 * | 10/2002 | Boudreault et al. ......... 380/239 |
| 2003/0140241 | A1 | 7/2003 | England et al. |
| 2004/0075749 | A1 * | 4/2004 | Kondo et al. .............. 348/222.1 |
| 2004/0162137 | A1 * | 8/2004 | Eliott .......................... 463/29 |
| 2004/0221167 | A1 | 11/2004 | Fenney et al. |
| 2005/0012756 | A1 | 1/2005 | Fenney et al. |
| 2007/0053513 | A1 * | 3/2007 | Hoffberg .................... 380/201 |

\* cited by examiner

3-D GRAPHICS TEXTURING SYSTEM USING ENCRYPTED TEXTURES

CROSS-REFERENCE TO RELATED APPLICATIONS

This application is a continuation of U.S. Ser. No. 10/969,491, filed Oct. 20, 2004 now U.S. Pat. No. 7,176,934, which is a continuation of U.S. Ser. No. 10/236,068, filed Sep. 3, 2002 now abandoned, which corresponds to U.K. Application No. 0121382.6, filed Sep. 4, 2001.

FIELD OF THE INVENTION

This invention relates to a texturing system for use in a three-dimensional graphics system. It also relates to a method of distributing protected software applications.

BACKGROUND TO THE INVENTION

Computer graphics applications, in particular computer games, can be very expensive to develop. Unfortunately, they are also a popular target for software pirates, possibly because of the number of potential users. In the past, piracy was usually partially limited by supplying the application on a physical medium, e.g., either a ROM cartridge or a 'difficult to copy' disc, or by shipping a physical key, e.g. dongle. It is envisaged, however, that software will increasingly be sold electronically, e.g. downloaded from the Internet or from a 'point of sale', POS, terminal in a shop. This lack of a physical medium would thus potentially make illegal copying a much simpler task unless other measures are taken.

The protection of software against piracy has relied on several techniques in the past. One of the techniques is the use of a 'difficult to replicate' physical medium for storage of the software application. For instance, some computer games console manufacturers have used "Read Only Memory" (ROM) cartridges, or proprietary variants of common media such as higher density CD ROMs for which no off-the-shelf duplication tools exist.

An alternative technique often used for personal computers is to use standard media, such as floppy disks or CDs, but deliberately 'damage' them in small areas during the manufacturing process using, say, a laser. The application software then contains instructions to check that the supplied storage medium contains these errors. An off-the-shelf floppy drive or CD-Rom 'burner' would not be able to reproduce the error on the medium. Although the checks for the errors can be hidden within the software to a certain extent, if given sufficient time, a determined cracker can locate them and produce a modified version of the application with the checks removed. This 'cracked' software could then be stored and run using off-the-shelf media.

Another method of protecting the contents of the software from being modified would be to use a 'secure' CPU which could encrypt all the transfers to and from an external memory.

Such processors, however, are not common and this method may not be a viable option for the manufacturer of a computer graphics device. Furthermore, this method does not prevent copying of the application, because this method can prevent only modification.

Some devices, such as ethernet adapters and some computers, are constructed with an in-built unique identifier. We have appreciated that this identifier could be used to customize software so that it runs on only one machine. Again, unless other steps are taken, this would be open to abuse by modification of the software that removes the checks.

SUMMARY OF THE INVENTION

Figure 1A:
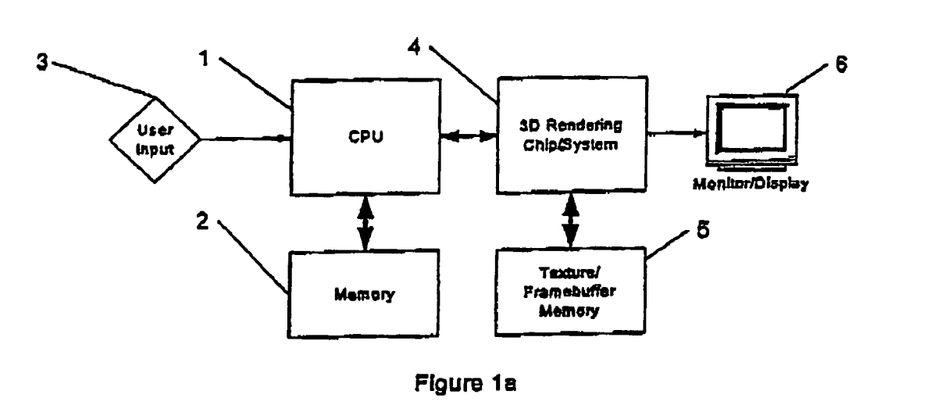
FIG. 1a is a block diagram of a known three-dimensional graphics rendering system.

The present invention in particular deals with systems and applications processing 3D computer graphics rendering. A typical known environment is illustrated in FIG. 1a. Here a CPU 1 is connected to a memory 2 that would contain the application code and data structures. The application would typically respond to user input 3. The description of each 3D image, typically composed of triangles with parameters for application of image, texture, or data, is generated by the CPU 1 and this object data is sent to the rendering subsystem 4. The rendering subsystem 4 would use texture data stored in a memory 5 to produce image data which would be constructed in a framebuffer in the memory 5. The finished images would then be sent to a display system 6. In some systems, memory units 2 and 5 might actually be the same physical memory.

Figure 1B:
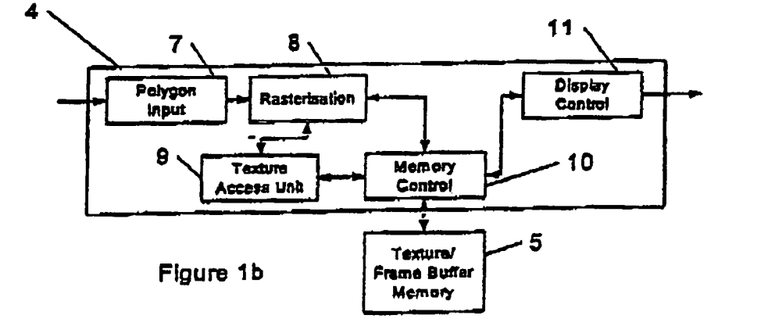

The known 3D rendering system 4 is now described in more detail with reference to FIG. 1b. The rendering system 4 consists of a unit 7 receiving polygon data. These polygon data are sent either individually or in batches to the rasterization unit 8 which determines which pixels in the final image are affected by which polygons and what colors to assign to the pixels. As part of this process, texture data must be accessed by a texture access unit 9. This involves converting numerous requested texture identifiers and pixel coordinate positions into color values and may require access to the memory of the 3D rendering system via a memory control system 10. This memory control system would also handle framebuffer read and write requests from the rasterization unit 8. Finally, the display control system 11 would transfer finished images from the memory to the display device.

The aim of the invention is to ameliorate the problems associated with the known distribution techniques. In accordance with the present invention in a first aspect, a texturing system for use in a 3D graphics system is provided. The texturing system comprises: an input for receiving object data describing an object to be textured; a store for storing encrypted texture data to be applied to the object to be textured; a decryption unit, coupled to the store, for decrypting the encrypted texture data; a framebuffer, coupled to the input and to the decryption unit, for applying decrypted texture data to the object data to generate textured image data; and an output, coupled to the framebuffer, for outputting the textured image data for display. Preferred features of the texturing system include a key production unit and an encryption key identification data. Requiring the encrypted static texture data to be decrypted before it can be applied to the object data provides means of protecting an application by making it difficult to copy the texture data which could be used by another device to run the same application.

In accordance with a second aspect of the invention, a method of applying texturing to three-dimensional graphics data is provided. The method comprises the steps of: storing encrypted texture data to be applied to an object to be textured; receiving object data describing the object to be textured using stored texture data; accessing and decrypting the encrypted texture data; applying decrypted texture data to the object data to generate textured image data; and outputting the textured image data for display. Preferred steps further include: receiving encryption key identification data identifying an encryption key used to encrypt the encrypted texture data; generating the encryption key from the encryption key identification data; and using the encryption key to decrypt the encrypted texture data.

In accordance with the present invention in a third aspect, a method of producing a software application is provided. The software application is protected by the encryption of the static texture data so that only authorized devices can decrypt the static texture data and run the software application. Preferred features include a device identifier used in a distribution device.

In accordance with a fourth aspect of the invention, a method of distributing a protected software application from a distribution device to a target device is provided.

In accordance with a fifth aspect of the invention, a 3D graphics device is provided.

We have appreciated that many of the textures used by applications, especially games applications, will be created at the time the application is written. For the purposes of this invention, these will be referred to as static textures. Other textures may be produced while the application is running and these will be referred to as dynamic textures.

The aim of the invention is to make the widespread duplication of graphics software, in particular games software, difficult. The invention performs this through a combination of protection circuitry within the rendering hardware and protection of he static texture data, rather than by relying on obfuscation of the software, use of a protected CPU, and/or use of a proprietary storage medium. The invention realizes the protection of the software from unauthorized use by encrypting static texture data and controlling decryption of the texture data associated with a software application. The invention includes a method of adapting computer graphics hardware with additional software production steps to inhibit widespread copying of such applications.

The system of the present invention relies on the fact that a reasonable proportion of the computer graphics application, in particular a computer game, is static texture data which is prepared during the applications development. To protect the application, the standard 3D rendering hardware system is modified in five main ways. First, each rendering chip has a unique, or at least very infrequently repeating, identification code embedded in it. Second, a set of secret keys is built into the silicon of the rendering chip and made virtually impossible to access. Information on certain secret keys is then released only to trusted parties. Third, a number of externally stored textures of each application are encrypted during development and are only decrypted within the 3D rendering chip by the texturing system during the rendering processes. Fourth, the encrypted static textures are marked with a secure checksum so that the rendering can be made to terminate if invalid texture data is supplied. Finally, the software delivery system is also modified so that it can modify or 'tailor' the software for a specific target device on which the application is to run.

It should be noted that dynamic textures, i.e., those generated by software while the application is running, are not encrypted or protected. If a symmetric (i.e. private key only) cipher were used, this would require storing the key in the application thus exposing it to a determined software pirate. An alternative would be to use a public/private key system. However, at present the key system is much slower, and so the time to encrypt the texture would make the technique undesirable in a real time system.

BRIEF DESCRIPTION OF THE DRAWINGS

An embodiment of the invention will now be described in more detail with reference to the accompanying drawings in which:

FIG. 1b is a block diagram showing details of the system in FIG. 1a;

DESCRIPTION OF PREFERRED EMBODIMENTS

Figure 2A:
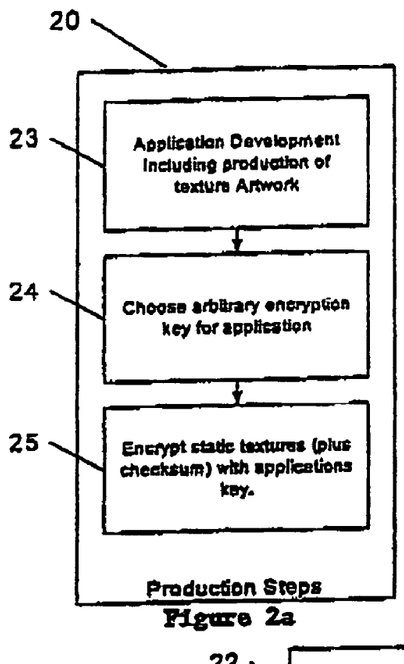
FIG. 2a is a flow chart showing the steps involved in the production of a software application using encrypted texture data.
Figure 2B:
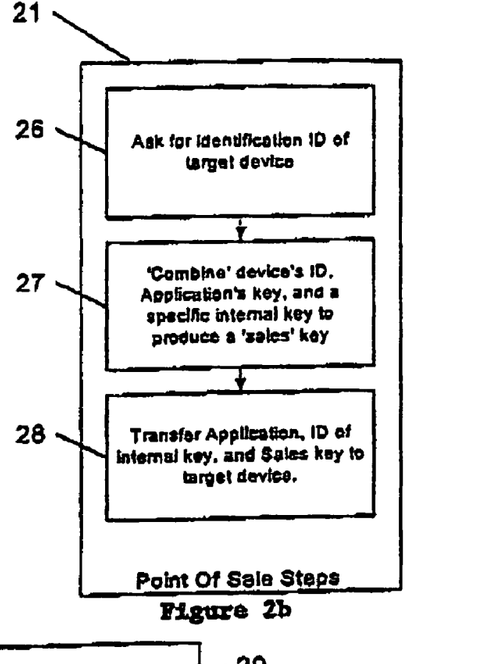
FIG. 2b is a flow chart showing the steps involved in modifying a software application for transferring to a target device.
Figure 2C:
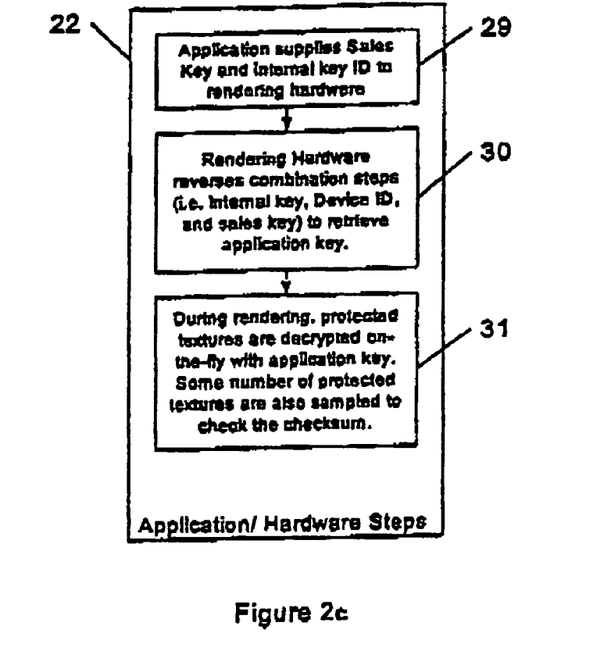
FIG. 2c is a flow chart showing the steps taken by the target device to allow the modified software application to run.

In a preferred embodiment, the protection system would consist of three main processing phases as illustrated in FIGS. 2a to 2c. These would be a production (or development) phase 20 which occurs during the authoring of the software, an optional 'point of sale' phase 21 that occurs when the software is purchased electronically, and a runtime/rendering phase 22 which takes place when the software is run on the device.

The production phase further consists of the standard application development steps 23, and two new steps. The first is to choose (preferably via random means) an application specific encryption key 24, which will be referred to as AEK, and a second step 25 whereby the majority of the static textures, i.e. those textures which are simply loaded into the texture memory and not otherwise modified by application software during the running of the application, are checksummed and are encrypted by means of the AEK. In a preferred embodiment, the encryption system would be a private key system, and for security reasons, the AEK in preferred embodiments would be at least 64 bits in size.

The 'point of sale' phase 21 applies to the cases where the application is supplied electronically (i.e. no mass-produced physical medium is used). The first step 26 is to request the unique (or near unique) identifier of the target device, DevID. The next step 27 is to securely combine the DevID, the AEK, and one of several secret keys embedded inside the rendering chips to produce a sales key, SAK, which is specific to the pairing of that application and the target rendering device. The final step 28 is to download the entire application data, including its textures encrypted with the AEK, to the target device, along with the SAK, and an index for the secret key that was used in step 27.

If the point of sale phase described below is not used, for example if the application is to be provided on a physical medium rather than to be downloaded, then two options are possible. First, an in-built 'set-up' program asks the owner to contact, for example via a free phone number, a support operator who would ask the user for the device's serial/identification number and in return supply a Sales Key. This key would then be inputted by the owner and saved by the application (typically in removable memory units) for future execution of the application. Alternatively, a small subset of the set of the embedded secret key identifiers could have the side effect of 'replacing' the internal device identifier, DevID, with a known constant value, thus enabling identical copies of the mass produced media to run on any device.

The run-time rendering phase 22 requires that the application supplies the SAK and the internal secret key to the rendering hardware 29. In a reversing step 30, the rendering hardware reverses the combination steps 27 applied in the point of sale phase using the internal keys, DevID and SAK to retrieve the AEK. During rendering 31 the protected textures are decrypted on-the-fly using the AEK. In a preferred embodiment of the run-time rendering phase 22, a number of protected textures are sampled and the checksum is verified.

Figure 3:
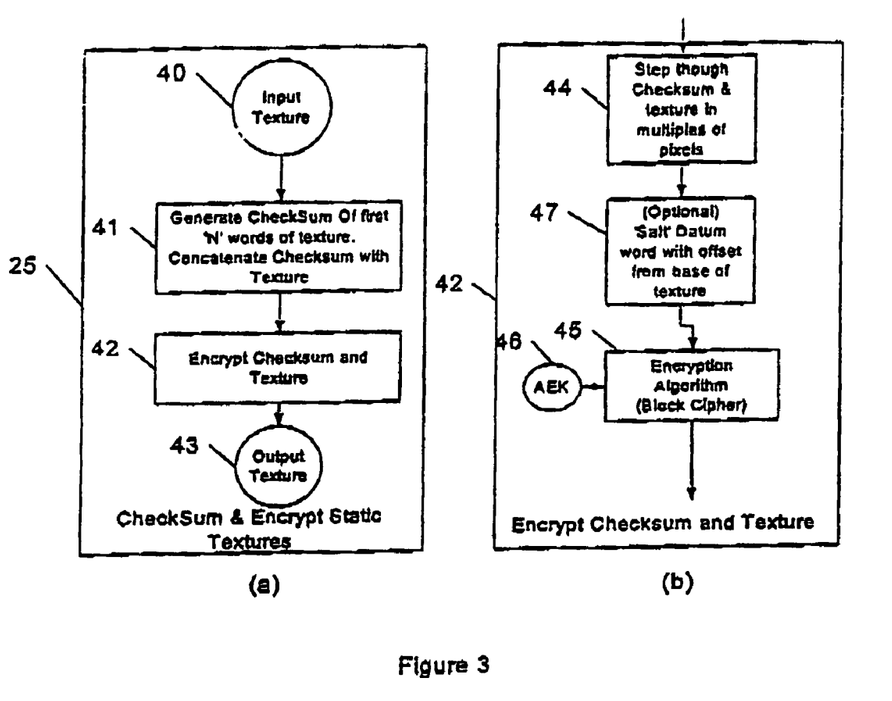
FIG. 3a is a flow chart showing generation of a security checksum and encryption of the texture data.
FIG. 3b is a flow chart showing details of the steps involved in the generation of the checksum.

A preferred method for the generation of the security checksum and the encryption of the texture data 25 will now be described with reference to FIG. 3a. Each static texture 40 is supplied and a per-texture checksum is generated from the first 'N' words 41 of the texture. The choice of 'N' is a compromise between the level of security desired and the time taken to test the validity of the texture. In a preferred embodiment, this would be the first four words where the word size would be 64 bits, but other combinations could be chosen. The checksum function could be a simple operation such as the summation, modulo $2^{64}$, or a trivial bit-wise XOR, i.e. exclusive OR, of the data words.

The checksum is concatenated with the entire texture, and the result is then encrypted in step 42 and outputted in step 43. The encryption step 42 is described in more detail in FIG. 3b. In step 44 data blocks corresponding to the width of the block cipher algorithm 45 are issued to the encryption algorithm. An example of a suitable block cipher algorithm could be one of the current NIST "Advanced Encryption Standard" candidates, such as "TwoFish", or even the earlier Triple DES standard.

The texture is effectively encrypted in 'Electronic Code-Book', or ECB, mode, using the AEK 46. To improve security in a preferred embodiment, the input values would be 'salted' in step 47 with their position being offset relative to the base of the texture using a XOR operation. For example, the $J^{th}$ block of data from the texture could be XORed with the binary representation of the number J prior to encryption. This helps obscure the contents of the texture and increases the difficulty of code book based attacks. Note that many more advanced cipher modes, for example cipher block chaining, CBC, are not suitable for texturing as they do not permit random access of the pixels within the encrypted textures.

Figure 4:
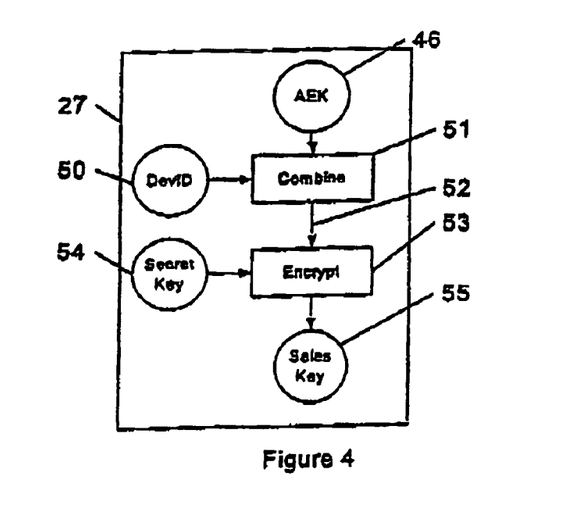
FIG. 4 is a flow chart showing generation of a Sales Key.

The production of the sales key 27 is illustrated in FIG. 4. This is done by taking the Device ID, DevID, 50 and the AEK 46, and combining them in step 51 using an easily reversible operation, to produce encryption definition data as an intermediate result 52. In a preferred embodiment this combination operation could be an addition or a bitwise exclusive OR, and the output would be at least 64 bits. The operation is reversible in the sense that given the Device ID and the intermediate result, it is simple to derive the AEK.

The encryption definition data is then encrypted in step 53 with a block cipher using a secret key 54, a copy of which will be embedded in or derivable within every rendering chip. This secret key is never publicly revealed but is known to the distribution device or the sales tool. In a preferred embodiment a plurality of secret keys would be embedded in the event that the current secret key was comprised. Alternatively, a public key system such as RSA (U.S. Pat. No. 4,405,829) or a key-exchange system such as Diffie-Helman's (U.S. Pat. No. 4,200,770) could be used. The public key is used in the sales tool and the private key would be embedded within the rendering hardware.

Figure 5:
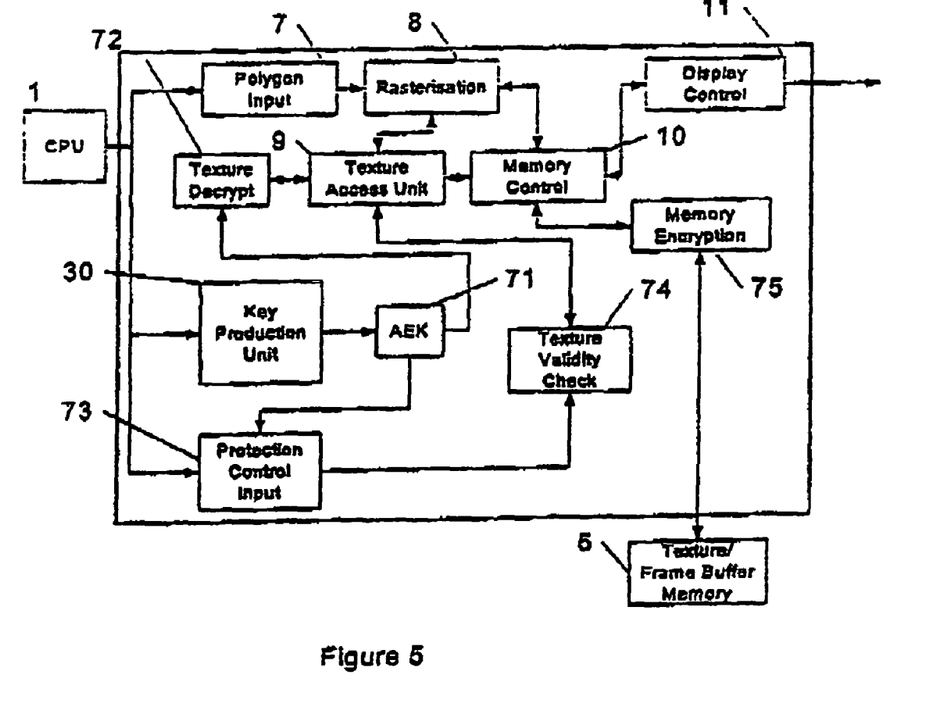
FIG. 5 is a block diagram showing a texturing system.

The encrypted result 55 is used as the sales key, SAK, which is exported with a copy of the application. FIG. 5 illustrates the modifications made to the rendering unit 4 that was originally described in FIG. 1b. The modified unit contains a Key Production Unit 30 that accepts the Sales Key, SAK, and the identifier for the internal secret key, and reverses the steps described in FIG. 4. This produces the internal copy of the encryption key 71 of the application. This key is supplied to the texture decryption unit 72 which decrypts texture pixels needed by the texture access unit 9. It should be noted that, with the hardware described, if an invalid key were supplied, the textures on the polygons would appear as random noise.

In addition, a protection control input unit 73 would receive a command word or words from the application running on the CPU 1, when the application starts executing. To prevent the process from being compromised by deliberate modification of the application, these commands will have been encrypted with the internal AEK 71. The unit 73 decrypts the command and supplies it to the Texture Validity Check unit 74. While each scene is rendered, this unit 74 samples some number of the protected textures, via the texture access unit 9, to test that the stored checksum matches a checksum computed from the start of the texture data. Actions, determined by the command supplied by protection control input 73, can be taken if these matches fail. The choice of actions would depend on the target market of the device, but a choice of possible actions could include shutting down the rendering chip, sending an interrupt to the CPU, and replacing the 'textures' with a flat shaded mode which could be used for demonstration purposes.

In a preferred embodiment, there would be a delay, determined by a clock counter, before an action would be taken by the validity unit 74. This makes attacks based on repeatedly guessing a less restrictively encrypted command infeasible due to the time taken.

Furthermore, in a preferred embodiment, there is a memory encryption/decryption unit 75 positioned between the memory controller 10 and the memory 5. This unit is intended to make reverse engineering of the original contents of the static textures more difficult assuming an attack involving re-writing the application.

Figure 6:
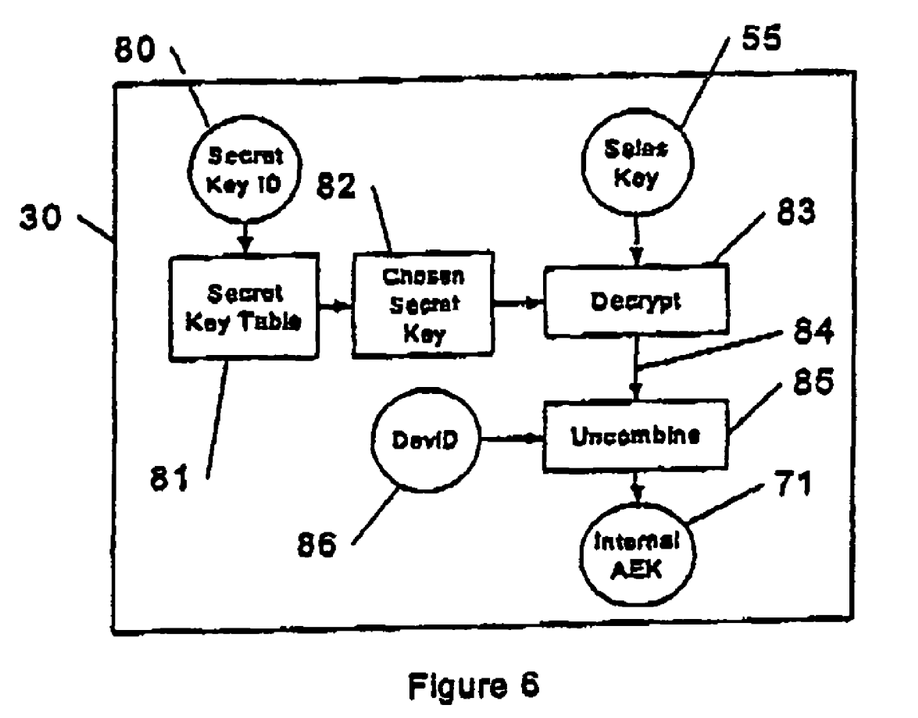
FIG. 6 is a flow chart showing the steps performed by the key production unit of the texturing system.

The process of the key production unit 30 will now be described in reference to FIG. 6. The application supplies the identifier for the secret key that was used by the sales application in the combination step 27. This accesses a secret key table or function 81 that returns the actual secret key 82. In a preferred embodiment, the secret key would be at least 64 bits in size assuming that a symmetric cipher is used. A much larger key would be needed if a public/private key system is employed. The chosen secret key 82 is then used to decrypt the sales key 55, which is also supplied by the application, using the decryption function 83. This function must be the inverse of the encryption step 53. The intermediate result 84 which is identical to that of intermediate result 52 is then supplied along with the Device ID 86 to a separation or 'uncombine' operation 85 which is the reverse of the combination operation 51. The result is the internal Application Encryption Key 71 that is identical to that chosen in step 24, and is subsequently used in step 46. The preferred embodiment has a choice of several secret keys, and in the event of a security breach in the point of sale application, there is a fall-back position so that future releases might not be compromised.

Figure 7:
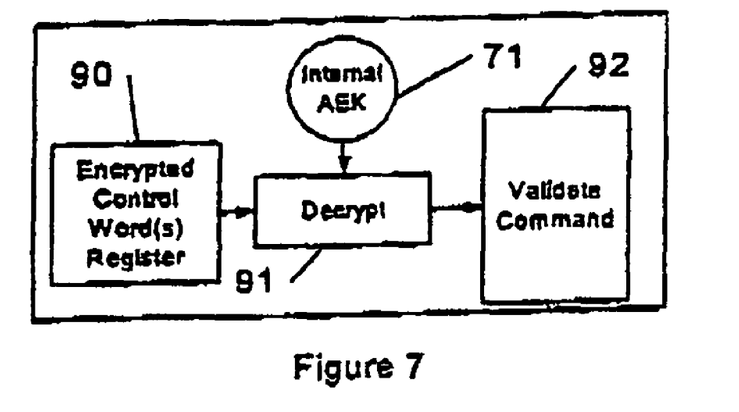
FIG. 7 is a diagram showing the steps performed by the production control unit.

The system must also protect the instructions issued to the rendering system from the application with regard to its process for checking valid textures. This is done within the protection control unit 73, and the operation is now described in reference to FIG. 7. The application supplies one of several legal instructions which have been encrypted during the development phase with the AEK 24, and this is stored in the Encrypted Control Word Register 90. To inhibit the random guessing of a less restrictive control word, the register in a preferred embodiment should be at least 64 bits wide. The contents of the register are then decrypted in step 91 using the internal copy of the AEK 71. The decrypted results are then checked to see if they match one of the small set of valid commands 92. An invalid command will result in a very restrictive command being sent to the validity check module 74 which, in a preferred embodiment, would bring the rendering to a halt after a delay.

It should be noted that when the circuits are implemented in silicon, the areas controlling the protection, in particular the secret keys, should not be accessible by register test scan chains. Furthermore, it is important that the secret keys should not be released to the public.

With respect to the above description, equivalent apparatus and methods are readily apparent to one skilled in the art, and all of the equivalent apparatus and methods to those illustrated in the drawings and described in the specification are intended to be encompassed by the present invention. Therefore, the foregoing is considered as illustrative only of the principles of the invention.

Further, since numerous modifications and changes will readily occur to those skilled in the art, it is not desired to limit the invention to the exact construction and operation shown and described, and accordingly, all suitable modifications and equivalents are within the scope of the invention.

It should be noted that the features described by reference to particular figures and at different points of the description may be used in combinations other than those particularly described or shown. All such modifications are encompassed within the scope of the invention as set forth in the following claims.

For example, different techniques for encrypting the texture data, such as the public/private key system, could be employed.

What is claimed is:

1. A texturing system for use in a three-dimensional graphics system, the texturing system comprising:
   an input for receiving object data describing an object to be textured;
   a store for storing encrypted texture data to be applied to the object to be textured;
   a decryption unit, coupled to the store, for decrypting only the encrypted texture data;
   a framebuffer, coupled to the input and to the decryption unit, for applying decrypted texture data to the object data to generate textured image data; and
   an output, coupled to the framebuffer, for outputting the textured image data for display.

2. A method of applying texturing to three-dimensional graphics data in a three-dimensional computer graphics system, the method comprising the steps of:
   providing a texturing system;
   storing encrypted texture data to be applied to an object to be textured in a store of the texturing system;
   receiving object data describing the object to be textured using stored texture data in an input of the texturing system;
   accessing and decrypting only the encrypted texture data in a decryption unit;
   applying decrypted texture data to the object data to generate textured image data; and
   outputting the textured image data to a displaying means for display.

3. A method of applying texturing to three-dimensional graphics data in a three-dimensional computer graphics system, the method comprising the steps of:
   providing a texturing system;
   receiving encryption key identification data identifying an encryption key used to encrypt pre-encrypted texture data in an input of the texturing system;
   storing encrypted texture data to be applied to an object to be textured in a store;
   receiving object data describing the object to be textured using stored texture data in the input of the texturing system;
   accessing and decrypting the encrypted texture data in a decryption unit;
   applying decrypted texture data to the object data to generate textured image data; and
   outputting the textured image data to a display unit for display.

4. A three-dimensional graphics device for running a software application comprising instructions and encrypted texture data, the device comprising:
   a CPU for running the software application;
   a memory, coupled to the CPU, for storing the software application;
   displaying means for displaying three-dimensional graphics generated by running the software application; and
   a texturing system including:
      an input for receiving object data describing an object to be textured;
      a store for storing encrypted texture data to be applied to the object to be textured;
      a decryption unit, coupled to the store, for decrypting only the encrypted texture data;
      a framebuffer, coupled to the input and to the decryption unit, for applying decrypted texture data to the object data to generate textured image data; and
      an output, coupled to the framebuffer, for outputting the textured image data for display,
      wherein the input of the texturing system is coupled to the CPU and the output is coupled to the displaying means.

5. The three-dimensional graphics device according to claim 4, wherein the texturing system is configured to store a device identifier to be used in a distribution device.

6. The texturing system according to claim 1 further comprising a key production unit, coupled to the decryption unit and to the input, for generating an encryption key from an encryption key identification data, whereby the decryption unit uses the encryption key to decrypt the encrypted texture data.

7. A texturing system for use in a three-dimensional graphics system, the texturing system comprising:
   an input for receiving object data describing an object to be textured, the input being configured to receive encryption key identification data identifying an encryption key used to encrypt pre-encrypted texture data;
   a store for storing encrypted texture data to be applied to the object to be textured;
   a decryption unit, coupled to the store, for decrypting the encrypted texture data;

a framebuffer, coupled to the input and to the decryption unit, for applying decrypted texture data to the object data to generate textured image data; and an output, coupled to the framebuffer, for outputting the textured image data for display.

8. The method according to claim 3, further comprising the steps of:

generating the encryption key from the encryption key identification data; and using the encryption key to decrypt the encrypted texture data.

9. A three-dimensional graphics device for running a software application comprising instructions and encrypted texture data, the device comprising:

a CPU for running the software application;

a memory, coupled to the CPU, for storing the software application;

displaying means for displaying three-dimensional graphics generated by running the software application; and a texturing system including:

an input for receiving object data describing an object to be textured, the input being configured to receive encryption key identification data identifying an encryption key used to encrypt pre-encrypted texture data;

a store for storing encrypted texture data to be applied to the object to be textured;

a decryption unit, coupled to the store, for decrypting the encrypted texture data;

a framebuffer, coupled to the input and to the decryption unit, for applying decrypted texture data to the object data to generate textured image data; and an output, coupled to the framebuffer, for outputting the textured image data for display, wherein the input of the texturing system is coupled to the CPU and the output is coupled to the displaying means.

10. The three-dimensional graphics device according to claim 9, wherein the texturing system is configured to store a device identifier to be used in a distribution device.

11. The texturing system according to claim 7 further comprising a key production unit, coupled to the decryption unit and to the input, for generating the encryption key from the encryption key identification data, whereby the decryption unit uses the encryption key to decrypt the encrypted texture data.

12. The three-dimensional graphics device according to claim 9 further comprising a key production unit, coupled to the decryption unit and to the input, for generating the encryption key from the encryption key identification data, whereby the decryption unit uses the encryption key to decrypt the encrypted texture data.

13. The three-dimensional graphics device according to claim 4 further comprising a key production unit, coupled to the decryption unit and to the input, for generating an encryption key from an encryption key identification data, whereby the decryption unit uses the encryption key to decrypt the encrypted texture data.

\* \* \* \* \*